United States Patent Office 3,171,753
Patented Mar. 2, 1965

3,171,753
ZIRCONIUM STAIN FOR CERAMIC GLAZES
John Kenneth Olby, Surbiton, Surrey, England, assignor to Associated Lead Manufacturers Limited, London, England, a British company
No Drawing. Filed Dec. 22, 1961, Ser. No. 161,388
Claims priority, application Great Britain, Jan. 20, 1961, 2,417/61
4 Claims. (Cl. 106—299)

This invention relates to zirconium silicate stains for use in the production of glazes for ceramics.

A known stain for this purpose consists of a calcined mixture of zirconia, silica, sodium fluoride or other alkali metal halide and vanadium pentoxide, normally incorporated as ammonium vanadate. The calcined produce is essentially zirconium silicate with vanadium present in the crystal lattice, the sodium fluoride acting as a catalyst to promote formation of zirconium silicate. A typical known stain of this character having a blue colour consists of a mixture of 100 parts by weight of $ZrO_2$, 49.6 parts by weight of $SiO_2$, 3.6 parts by weight of NaF and 6.09 parts by weight of $NH_4VO_3$.

I have found according to the invention, that zirconium silicate stains of various colours can be obtained by substituting for the vanadium pentoxide the fluorides of certain elements specified below, some of which do not impart colouration to the stain when incorporated in the form of their naturally occurring oxides. These fluorides are fluorides of trivalent elements, which in some cases may assume a tetravalent state when the mixture of materials is calcined, and the atoms of these trivalent elements remain in the zirconium silicate lattice when the stain is incorporated in a glaze and fired. The fluorides which I have successfully used are those of chromium, iron, cerium, neodymium, terbium and erbium. When chromium and iron are incorporated in a zirconium silicate stain as fluorides they impart to the stain a colour different from that which they confer on glazes when incorporated therein as oxides.

The invention provides a zirconium stain for use in the production of glazes for ceramics which consists of a calcined mixture of zirconia, silica, sodium fluoride or other alkali metal halide, and a fluoride of one of the following elements, chromium, iron, cerium, neodymium, terbium or erbium, the stain consisting essentially of zirconium silicate with said element present in the crystal lattice and being made from a calcined mix containing 0.5–10% $CrF_3$, 1.0–15% $FeF_3$, 5–20% $CeF_3$, 5–20% $NdF_3$, 0.5–15% $TbF_3$, or 5–20% $ErF_3$, all percentages being percentages by weight of zirconia.

The above-mentioned fluorides yielded the following colours when they were incorporated in the amounts shown below in a mixture of 10 grammes $ZrO_2$, 4.96 grammes $SiO_2$ and 0.36 gramme NaF and the mixture was calcined at a temperature of about 950° for 1 hour:

| Element | How added | Colour produced |
|---|---|---|
| Chromium | 0.13–0.53 g. $CrF_3$ | Slightly grey green. |
|  | 0.80 g. $CrF_3$ | More orangy shade than above. |
| Iron | 0.69 g. $FeF_3$ | Light reddy-brown. |
| Cerium | 1.0 g. $CeF_3$ | Faint green. |
| Neodymium | 0.92 g. $NdF_3$ | Very pale pinky-mauve. |
| Terbium | 0.92 g. $TbF_3$ | Strong pure yellow. |
| Erbium | 0.92 g. $ErF_3$ | Very pale pink. |

The chromium fluoride and the iron fluoride were incorporated in the mixture as hydrated fluorides, the amounts quoted being based on the dry weight.

The metals of the above-mentioned fluorides remain in the zirconium silicate lattice to preserve the characteristic colour of the stain when the latter is utilized to produce a glaze.

The colour of the green stain produced by inclusion of chromium fluoride in the mix may be modified, in accordance with a further feature of the invention, by including in the mix bismuth or phosphorus in amounts respectively of 1.0–20% and 0.10–0.50% by weight of the zirconia.

Thus the colour of the green stain produced by calcining together 10 g. $ZrO_2$, 4.96 g. $SiO_2$, 0.36 g. NaF and 0.53 g. $CrF_3$ at about 950° can be modified as follows, by inclusion in the mixture subjected to calcination of the following proportions of bismuth or phosphorus:

| Modifier | Quantity added | Colour |
|---|---|---|
| Bismuth | 0.4–1.0 g. $Bi_2O_3$ | Yellowy green-mustard colour. |
|  | 2.0 g. $Bi_2O_3$ | Weak mustard colour. |
| Phosphorus | 0.05 g. P coprecipitated with $ZrO_2$ as described in U.S. patent No. 3,058,838. | Normal grey tone of green accentuated with some loss of intensity. |

The stains according to the invention may, for example, be incorporated in a glaze mixture made up as follows:

Frit (composition as below) _____ gms__ 75
Stain in accordance with any foregoing example _____ gms__ 7.5
China clay _____ gms__ 3.75
Water _____ mls__ 75

This mixture was milled for 4 hours, sprayed on to a tile and fired at 1050° C.

Frit composition: Percent
Potash felspar _____ 46.9
Flint _____ 14.6
Whiting _____ 15.1
Barium carbonate _____ 3.1
Boric acid _____ 13.0
Anhydrous borax _____ 4.7
Kaolin _____ 2.6

The amount of silica included in the stain is such that substantially all of it reacts with the zirconia to form zirconium silicate and is in the range of 48.8–50% by weight of the zirconia. The amount of sodium fluoride required is in the range of 1.8–9.0% by weight of the zirconia.

What I claim as my invention and desire to secure by Letters Patent is:

1. A zirconium stain for use in the production of glazes for ceramics which consists of a calcined mixture of zirconia, silica, sodium fluoride, and a fluoride of an element selected from the group consisting of chromium, iron, cerium, neodymium, terbium and erbium, the stain consisting essentially of zirconium silicate with said element present in the crystal lattice and being made from a calcined mix of zirconia, 48.8–50% silica, 1.8–9% sodium fluoride, and 0.5–10% in the case of $CrF_3$, 1.0–15% in the case of $FeF_3$, 5–20% in the case of $CeF_3$, 5–20% in the case of NdF$_3$, 0.5–15% in the case of TbF$_3$, and 5–20% in the case of ErF$_3$, all percentages being percentages by weight of zirconia.

2. A stain as claimed in claim 1, in which the mixture contains chromium fluoride and, as a colour modifier, bismuth in an amount of 1.0–20% by weight of the zirconia, said bismuth being in the mixture as bismuth oxide.

3. A stain as claimed in claim 1, in which the mixture contains chromium fluoride and, as a colour modifier, phosphorus in an amount of 0.10–0.50% by weight of the zirconia, said phosphorus being in the mixture as phosphate.

4. A glaze for ceramics which includes a zirconium stain as claimed in claim 1.

References Cited by the Examiner
UNITED STATES PATENTS

| | | | |
|---|---|---|---|
| 2,871,138 | 1/59 | Linnell | 106—299 |
| 2,992,123 | 7/61 | Seabright | 106—299 |
| 3,005,724 | 10/61 | Seabright | 106—304 |
| 3,025,178 | 3/62 | Seabright | 106—299 |

TOBIAS E. LEVOW, *Primary Examiner.*

JOHN R. SPECK, *Examiner.*